US011740609B2

(12) United States Patent
Diosdado Borrego et al.

(10) Patent No.: US 11,740,609 B2
(45) Date of Patent: Aug. 29, 2023

(54) ROTATING PARTS WITHIN A BUILD VOLUME

(71) Applicant: HEWLETT-PACKARD DEVELOPMENT COMPANY, L.P., Spring, TX (US)

(72) Inventors: Jorge Diosdado Borrego, Sant Cugat del Valles (ES); Marc Garcia Grau, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 145 days.

(21) Appl. No.: 17/244,685

(22) Filed: Apr. 29, 2021

(65) Prior Publication Data

US 2022/0350303 A1    Nov. 3, 2022

(51) Int. Cl.
*G05B 19/4099* (2006.01)
*B33Y 50/00* (2015.01)

(52) U.S. Cl.
CPC .......... *G05B 19/4099* (2013.01); *B33Y 50/00* (2014.12); *G05B 2219/35134* (2013.01); *G05B 2219/49023* (2013.01)

(58) Field of Classification Search
CPC ...... G05B 19/4099; G05B 2219/35134; G05B 2219/49023; G05B 2219/49007; G05B 2219/49008; B33Y 50/00; B33Y 50/02; B29C 64/386; G06F 30/12; G06F 2111/04; G06F 2113/10; G06F 30/20; B22F 10/20; B22F 10/80; Y02P 10/25
USPC ....................... 700/98, 118; 703/1
See application file for complete search history.

(56) References Cited

U.S. PATENT DOCUMENTS

| | | | |
|---|---|---|---|
| 2008/0006958 A1* | 1/2008 | Davidson | B33Y 40/00 425/72.1 |
| 2016/0254642 A1* | 9/2016 | Takigawa | H01S 5/02469 372/34 |
| 2019/0134970 A1* | 5/2019 | Zeng | B33Y 30/00 |

FOREIGN PATENT DOCUMENTS

| | | | |
|---|---|---|---|
| WO | WO-2019209333 A1 * | 10/2019 | B22F 10/20 |
| WO | WO-2019236074 A1 * | 12/2019 | B22F 10/14 |

* cited by examiner

*Primary Examiner* — Thomas C Lee
*Assistant Examiner* — Michael Tang
(74) *Attorney, Agent, or Firm* — Michael Dryja

(57) ABSTRACT

A method is described in which a digital model of a part to be formed within a build bed is received. The model is rotated within a build volume of the build bed such that the projected area of the part in a plane normal to a flow axis is reduced. The flow axis is an axis along which a flow of gas moves through the build bed during a post-print operation, or the flow axis is defined by a type of post-print operation to be performed on the build bed.

20 Claims, 4 Drawing Sheets

(a)

(b)

(a)

(b)

ROTATING PARTS WITHIN A BUILD VOLUME

BACKGROUND

In some examples of 3D printing, parts may be formed through the selective solidification of powdered build material. The printed parts may then be separated from the unused build material in a post-processing operation.

DETAILED DESCRIPTION

In some examples of 3D printing, parts may be formed layer-by-layer through the selective solidification of powdered build material. In some examples, selective solidification may be achieved by fusing the build material. For example, in selective laser sintering systems, a focused laser may be used to apply thermal energy to specific portions of the build material to cause fusing. In agent-based jetting systems, a fusing agent may be printed on to specific portions of the build material and a non-focused heat source may apply thermal energy to the build material. Those portions of the build material on which the fusing agent is printed absorb sufficient energy to cause the build material to melt and fuse. In another example of agent-based jetting, selective solidification may be achieved by printing a binder onto specific portions of the build material, and then curing the binder.

In a particular example of agent-based jetting, a layer of powdered build material is deposited onto a bed, and a binding agent is selectively applied to regions of the powder. Liquid components in the binding agent may partially evaporate, and the bed is lowered ready for the next layer of build material. This process is then repeated layer-by-layer until the build bed is complete. After printing, the build bed may be heated to complete the evaporation of the liquid components and to cure the remaining binder to achieve a solid part. During this post-print operation, air or other gas may be drawn through the build bed to help remove the evaporated components.

Irrespective of the type of 3D printing, the resulting build bed may comprise solid parts surrounded by unused, powdered build material. The parts are then separated from the build material in a post-print operation. The post-print operation may be automated. In one example, the post-print operation may comprise vibrating the build bed. The post-print operation may additionally or alternatively comprise moving an airflow through the build bed in order to remove powdered build material from the parts.

The arrangement of the parts within the build bed may hamper efforts to remove the surrounding powdered build material, particularly when using an automated post-print operation. Additionally or alternatively, where a gas is drawn through the build bed (e.g. to remove evaporated components), the arrangement of the parts within the build bed may hamper the flow of gas.

Figure 1:
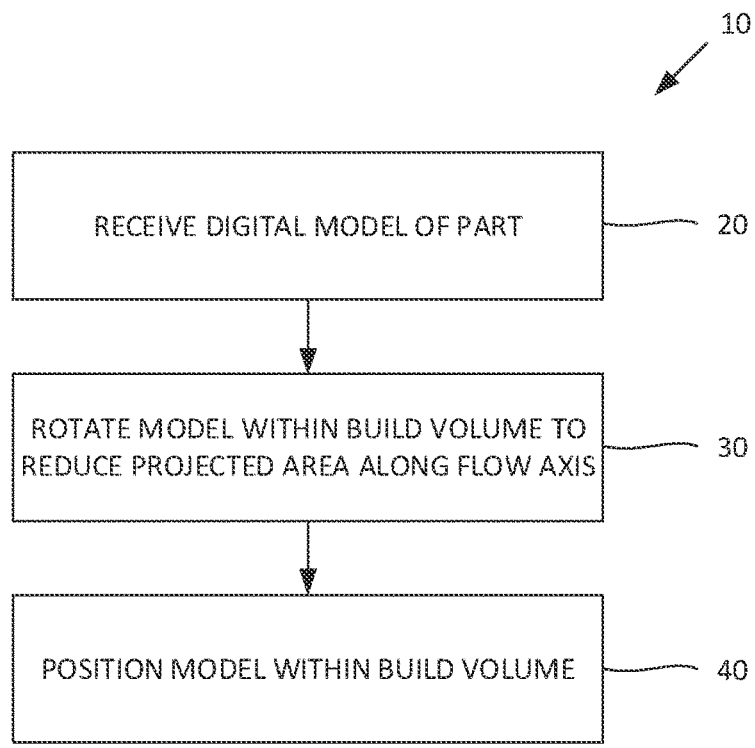
FIG. 1 shows an example method of arranging a part within a build volume.

FIG. 1 shows an example method of arranging a part within a volume of a build.

The method 10 comprises receiving 20 a digital model of a part to be formed within the build bed. In one example, the digital model may represent the part as a polygon mesh, such as a triangular mesh. In another example, the digital model may represent the part as a stack of polygons. In addition to the digital model, the method may comprise receiving data relating to the model, such as the color, material, position, orientation and scale of the part. The digital model, together with any additional data, may be received in one of number of different file formats, such as STL, SVG, OBJ, and 3MF.

The method 10 comprises rotating 30 the model within a volume of the build, hereafter to referred to as the build volume. The method 10 comprises rotating 30 the model within the build volume such that a projected area of the part in a plane normal to a flow axis is reduced. In one example, the model may be rotated using a rotation matrix. Rotation of the part may be constrained such that the part does not extend beyond the boundaries of the build volume or clash with other parts within the build volume.

The model may be rotated such that projected area along the flow axis (i.e. in a plane normal to the flow axis) is minimized. However, it may not be possible or desirable to rotate the model such that projected area of the part is minimized along the flow axis. For example, as already noted, rotation of the model may be constrained.

The flow axis may be an axis along which a flow of gas moves through the build bed during a post-print operation. In one example, the flow axis may correspond to an axis along which a gas flows to remove powdered build material from solid parts within the build bed. This post-print operation may additionally comprise vibrating the build bed such that the powdered build material falls downward under the influence of gravity. In this instance, the flow axis may be the vertical axis or z-axis of the build volume. In another example, the flow axis may correspond to an axis along which a gas flows through the build bed to remove to evaporated components, such as solvents of a binding agent. The method may comprise employing different flow axes for different types of post-print operation. For example, gas may flow through the build bed in a first direction in order to remove evaporated components, and in a second different direction in order to remove powdered material from solid parts. The method may comprise receiving data relating to a type of post-print operation to be performed on the build bed, and the flow axis may be defined by the type of post-print operation.

The method 10 comprises positioning 40 or translating the model within the build volume. As noted above, the method may comprise receiving data relating to the position of the model. The method 10 may therefore position 40 the model within the build volume based on the received position data. In another example, the method 10 may position 40 the model within the build volume so as to optimize packing within the build bed. In particular, the part may be one of a plurality of parts to be formed within the build bed, and the method may position the parts within the build volume so as to optimize the packing density. In a further example, the method 10 may position the model 40 within the build volume based on a user input. Accordingly, a user may manually position the part within the build volume.

Positioning 40 the model within the build volume may occur before or after rotating 30 the part. Moreover, the process of rotating 30 and positioning 40 the model may be iterative, particularly when the build volume comprises a plurality of parts. For example, the method may iteratively rotate and position the parts within the build volume such that the total projected area of the parts along the flow axis is reduced or minimized whilst ensuring that all parts are spaced sufficiently to ensure good part quality. In this regard, a minimum part spacing may be specified (e.g. by a user) and used to constrain the iteration.

Although the method 10 illustrated in FIG. 1 pertains to a single part, the method 10 might equally be used to arrange a plurality of parts within the build volume. In particular, the method may comprise receiving digital models of a plurality of parts to be formed within the build bed, and rotating the models within the build volume such that the projected area of each of the parts along the flow axis is reduced. The direction and/or the degree of rotation may be different for different parts. In particular, parts having different geometries may be rotated differently. Where a rotation matrix is used to rotate each model, the method may comprise using different rotation matrices for different models.

By rotating models within the build volume such that projected area of the parts along the flow axis is reduced, the flow of gas through the build bed during a post-print operation may be made easier. This is illustrated, by way of example, in FIG. 2.

Figure 2:
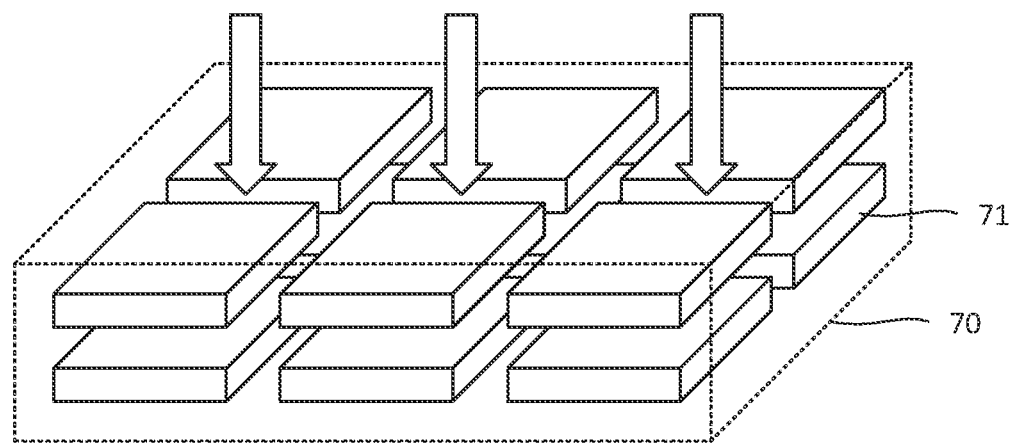
FIG. 2 shows two examples of a build volume in which (a) parts are arranged horizontally in layers, and (b) parts are arranged in accordance with the method of FIG. 1.
Figure 2:
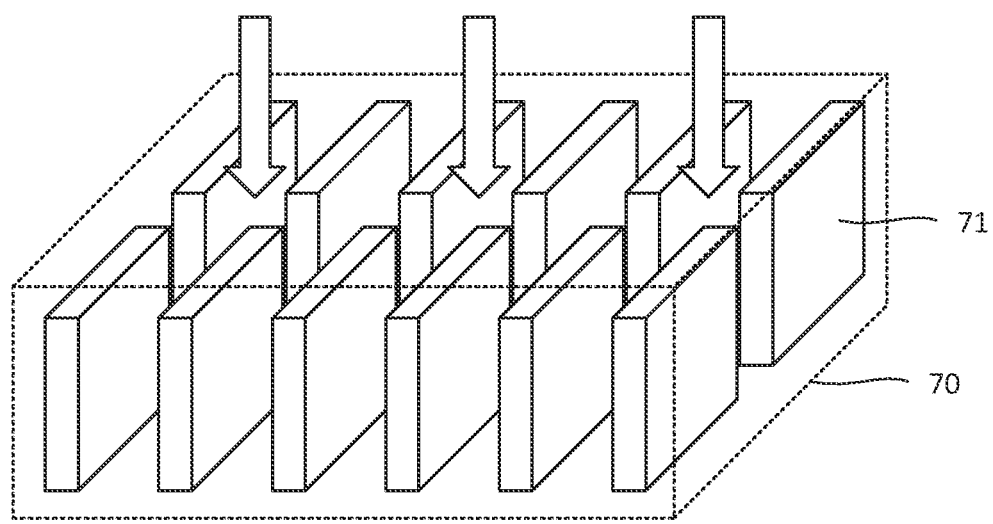

FIG. 2 illustrates two examples of a build volume 70 comprising a plurality of parts 71. The number and geometry of the parts are identical in both examples. In the example of FIG. 2(*a*), the parts 71 are arranged over two layers in a generally horizontal arrangement. Arranging the parts in this manner may minimize the height of the build volume 70, and thus the time taken to generate the build bed. In the example of FIG. 2(*b*), the parts 71 are arranged in accordance with the method of FIG. 1. In both examples, the build bed is subsequently subject to the same post-print operation in which a flow of gas moves through the build in a vertical direction to remove powdered material from the solid parts. The flow axis is therefore the vertical axis or z-axis of the build volume 70. With the example of FIG. 2(*a*), powdered build material may become trapped between parts 71 in the two layers during post-processing. By contrast, with the example of FIG. 2(*b*), powdered material is less likely to become trapped between adjacent parts. As a result, more of the powdered build material may be removed during the post-print operation.

Figure 3:
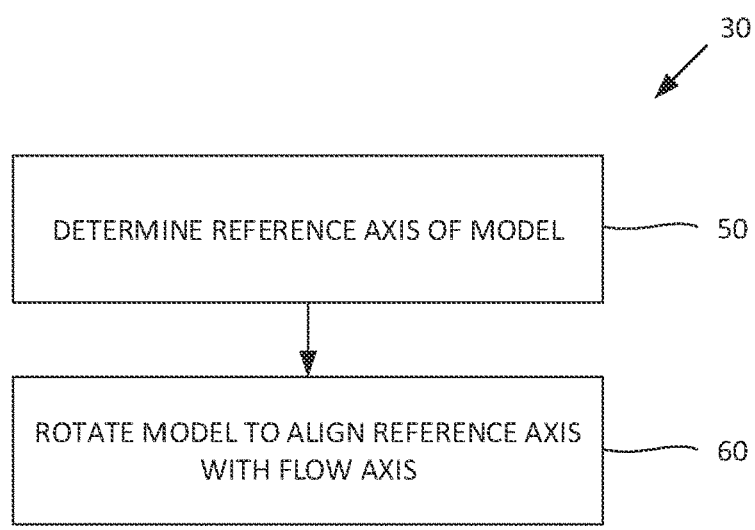
FIG. 3 shows an example method of rotating a part.

FIG. 3 illustrates an example method 30 of rotating a model such that the projected area of the part along the flow axis is reduced. The method 30 comprises determining 50 a reference axis of the part, and rotating 60 the model such that the reference axis is aligned parallel to the flow axis. In one example, rotating 60 the model may comprise determining a rotation matrix to align the reference axis and the flow axis, and then applying the rotation matrix to the model.

Figure 4:
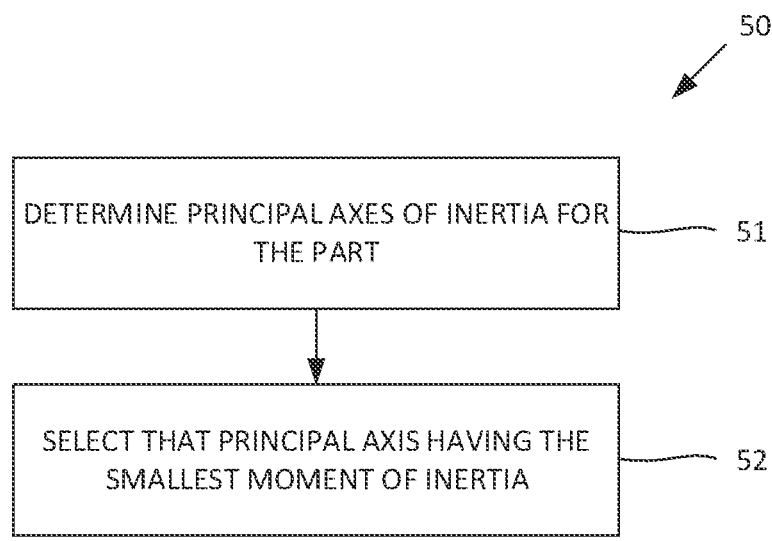
FIG. 4 shows an example method of determining a reference axis of a part.

FIG. 4 illustrates an example method 50 of determining the reference axis of a part. The method 50 comprises determining 51 the principal axes of inertia of the part, and selecting 52 that principal axis having the smallest moment of inertia.

For any three-dimensional part, there exists three mutually orthogonal axes for which the tensor of inertia is diagonal. These three orthogonal axes are referred to as the principal axes of inertia. Each of the principal axes (eigenvector) has a moment of inertia (eigenvalue) associated therewith. The principal axes and their moments may be regarded as representative of the mass distribution of the part. In particular, the mass perpendicular to each of the principal axes is proportional to its moment of inertia. Accordingly, the mass of the part is greater along that principal axis having the smallest moment. Where two or more principal axes have the same moment, this implies that the mass distribution of the part along each of the axes is the same. By way of example, all three principal axes will have the same moment for a part that is a sphere.

The method 50 comprises determining 51 the principal axes of the part and then selecting 52, as the reference axis, that principal axis having the smallest moment of inertia. Where more than one principal axis has the same smallest moment, the method may select any one of the principal axes having the smallest moment.

By determining the reference axis in this way, the model is rotated such that the majority of the mass of the part is aligned along the flow axis. As a result, the projected area of the part along the flow axis may be reduced. The projected area of the part may have a minimum along the principal axis having the smallest moment. In this instance, the part is rotated such that projected area along the flow axis is minimized. However, depending on the particular geometry of the part, there may instances for which the projected area of the part does not have a minimum along the principal axis having the smallest moment.

Figure 5:
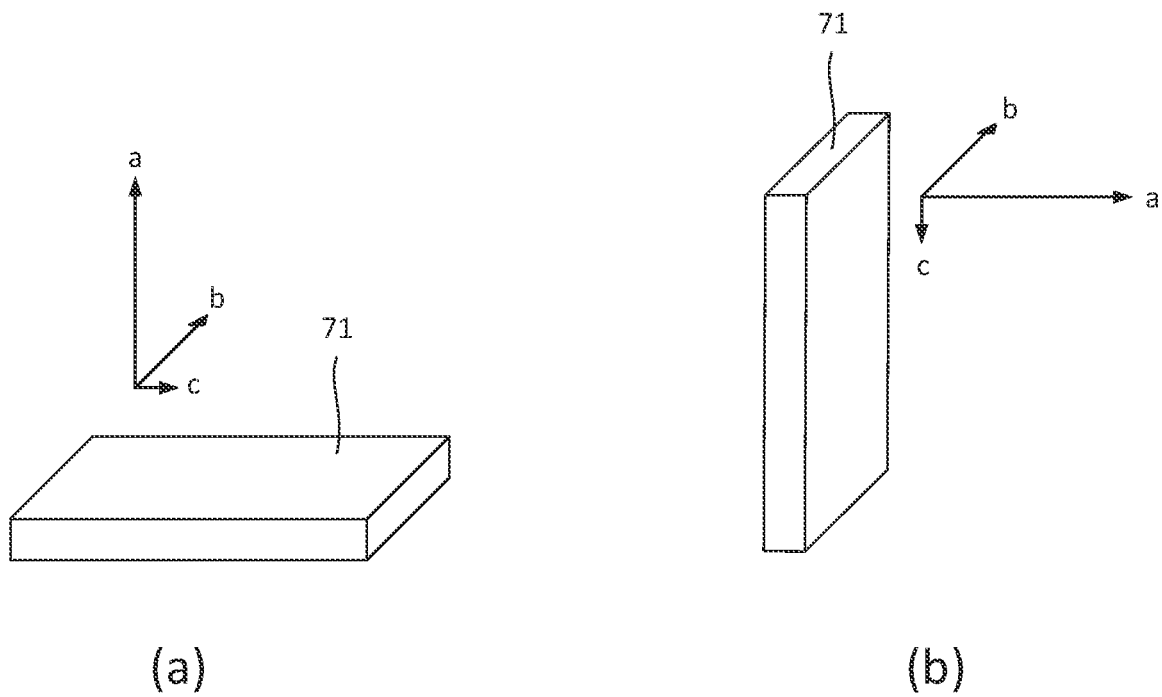
FIG. 5 shows an example part (a) before and (b) after rotation.

FIG. 5 illustrates a model of a part 71 (*a*) before and (b) after rotation. The principal axes and their moments are represented by the vectors a, b and c. The direction of each vector is defined by a principal axis and the magnitude of the vector is defined by the corresponding moment of inertia. In this particular example, the principal axis having the smallest moment is represented by vector c, and the flow axis is in the vertical direction. It can be seen in FIG. 5(*b*) that, for this particular example, the projected area of the rotated part 71 is minimized along the flow axis.

Figure 6:
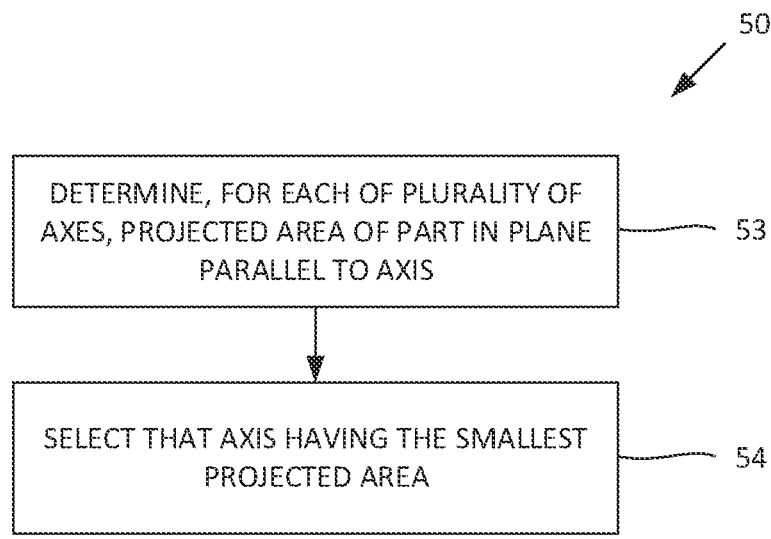
FIG. 6 shows a further example method of determining a reference axis of a part.

FIG. 6 illustrates a further example method 50 of determining the reference axis of a part. The method 50 comprises determining 53, for each of a plurality of axes, a projected area of the part in a plane normal to the axis, and selecting 54 that axis having the smallest projected area.

In one example, the method 50 may determine 53 the projected area for each of a set of predetermined axes. For example, the method may determine the projected area of the part along each of the axes x, y and z. That is to say that the method may determine the projected area of the part in the planes (1,0,0), (0,1,0) and (0,0,1). It is possible that the smallest projected area of the part lies along an axis that is not part of set of axes. For example, the smallest projected area could conceivably lie in the plane (1,1,1). Nevertheless, by determining 53 the projected area of the part along each of a set of axes and then selecting 54 that axis having the smallest projected area, a reduction in the projected area of the part along the flow axis may be achieved.

In another example, the method 50 may use mathematical optimization in order to determine 53 the reference axis. In particular, mathematical optimization may be used to determine a minimum in the projected area of the part for different axes. The cost function to be optimized may not be continuous. In this instance, stochastic optimization may be used to determine the reference axis, e.g. using basin hopping, grid searching, or genetic algorithms.

The optimization may determine a local minimum rather than a global minimum in the projected area. Accordingly, it is possible that the reference axis determined by the optimization is not that axis for which the projected area is a minimum. Nevertheless, the local minimum may still provide a reduction in the projected area of the part along the flow axis. Moreover, techniques are available within mathematical optimization which aim to avoid or escape from local minima, and which may be employed. For example, the method may comprise repeating the mathematical optimization using different starting points, i.e. using different starting axes.

Figure 7:
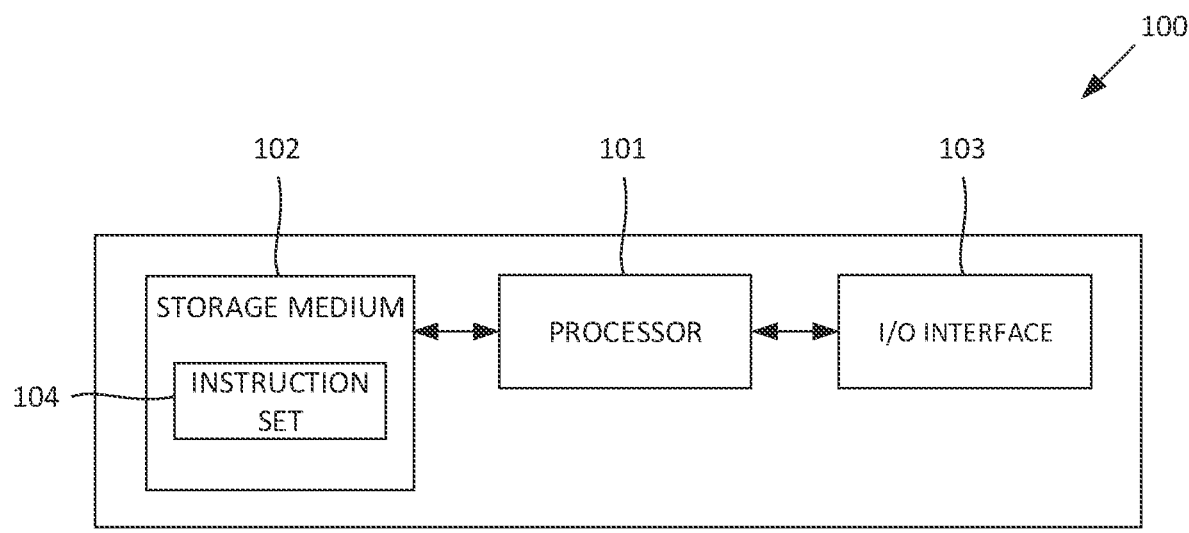
FIG. 7 is a block diagram of a computing device.

FIG. 7 is an example computing device 100 for implementing any one of the aforementioned methods. The computing device 100 comprises a processor 101, a non-transitory storage medium 102, and an input/output interface 103. The processor 101 is responsible for controlling the operation of the computing device 100 and executes an instruction set 104 stored in the storage medium 102. When executed by the processor 101, the instruction set 104 causes the computing device 100 to perform the example methods described above. For example, when executed, the instruction set 104 may cause the computing device 100 to: receive at the interface 103 a digital model of a part to be formed within a build bed; and rotate at the processor 101 the model with a build volume of the build bed such that the projected area of the part in a plane normal to a flow axis is reduced. The flow axis may be an axis along which a flow of gas moves through the build bed during a post-print operation, or the flow axis may be defined by a type of post-print operation to be performed on the build bed. The instruction set 104 may additionally cause the computing device 100 to determine a reference axis of the part, and rotate the model such that the reference axis is aligned parallel to a flow axis. Determining the reference axis may then comprise one of (i) determining, from a plurality of principal axes of inertia of the part, that axis for which the moment of inertia is smallest, and (ii) determining, from a plurality of axes, that axis for which a projected area of the part in a plane normal to the axis is smallest.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method comprising:
   receiving a digital model of a part to be formed within a build bed;
   rotating the digital model within a build volume of the build bed such that a projected area of the part in a plane normal to a flow axis is reduced, wherein the flow axis is an axis along which a flow of gas moves through the build bed during a post-print operation; and
   three-dimensionally (3D) printing the part within the build volume of the build bed in accordance with the digital model as has been rotated.

2. The method as claimed in claim 1, wherein the method comprises:
   receiving digital models of a plurality of parts to be formed within the build bed; and
   rotating the digital models within the build volume such that a projected area of each of the parts in a plane normal to the flow axis is reduced.

3. The method as claimed in claim 2, wherein the method comprises rotating different of the digital models in different directions or by different amounts.

4. The method as claimed in claim 1, wherein the method comprises determining a reference axis of the part, and rotating the digital model such that the reference axis is aligned parallel to the flow axis, wherein determining the reference axis comprises either:
   (i) determining principal axes of inertia of the part, and selecting that principal axis having a moment of inertia that is smallest; or
   (ii) determining, for each of a plurality of axes, a projected area of the part in a plane normal to the each of the plurality of axes axis, and selecting that axis having the projected area that is smallest.

5. The method as claimed in claim 1, wherein the flow axis is a vertical axis.

6. The method as in claimed in claim 1, wherein the method further comprises:
   after 3D printing the part, performing the post-print operation, including moving the flow of the gas through the build bed, resulting in removal of powdered build material from the part.

7. The method as claimed in claim 6, wherein rotation of the digital model within the build volume of the build bed improves the removal of the powdered build material from the part during movement of the flow of the gas through the build bed after the part has been 3D printed in accordance with the digital model.

8. A method comprising:
   receiving a digital model of a part to be formed within a build bed;
   receiving data relating to a type of post-print operation to be performed on the build bed;
   rotating the digital model within a build volume of the build bed such that a projected area of the part in a plane normal to a flow axis is reduced, wherein the flow axis is defined by the type of post-print operation;
   three-dimensionally (3D) printing the part within the build volume of the build bed in accordance with the digital model as has been rotated.

9. The method as claimed in claim 8, wherein the method comprises:
   receiving digital models of a plurality of parts to be formed with the build bed; and
   rotating the digital models within the build volume such that a projected area of each of the parts in a plane normal to the flow axis is reduced.

10. The method as claimed in claim 9, wherein the method comprises rotating different of the digital models in different directions or by different amounts.

11. The method as claimed in claim 8, wherein the flow axis is an axis along which powdered material is removed from the build bed during the post-print operation.

12. The method as claimed in claim 8, wherein the flow axis is an axis along which a flow of gas moves through the build during a post-print operation.

13. The method as claimed in claim 8, wherein the flow axis is a vertical axis.

14. The method as claimed in claim 8, wherein the method comprises determining a reference axis of the part, and rotating the digital model such that the reference axis is aligned parallel to the flow axis, and determining the reference axis comprises either:
   (i) determining principal axes of inertia of the part, and selecting that principal axis having a moment of inertia that is smallest; or
   (ii) determining, for each of a plurality of axes, a projected area of the part in a plane normal to the each of the plurality of axes axis, and selecting that axis having the projected area that is smallest.

15. The method as claimed in claim 14, wherein the method comprises:
receiving digital models of a plurality of parts to be formed with the build bed;
determining a reference axis of each of the parts; and
rotating the digital models within the build volume such that the reference axis of each of the parts is aligned parallel to the flow axis.

16. The method as in claimed in claim 8, wherein the method further comprises:
after 3D printing the part, performing the post-print operation, including either or both of moving a flow of gas through the build bed and vibrating the build bed, resulting in removal of powdered build material from the part.

17. The method as claimed in claim 16, wherein rotation of the digital model within the build volume of the build bed improves the removal of the powdered build material from the part during either or both of movement of the flow of the gas through the build bed and vibration of the build bed after the part has been 3D printed in accordance with the digital model.

18. A non-transitory storage medium storing instructions that, when executed by a processor of a computing device, cause the computing device to:
receive a digital model of a part to be formed within a build bed;
rotate the digital model with a build volume of the build bed such that a projected area of the part in a plane normal to a flow axis is reduced, wherein the flow axis is an axis along which a flow of gas moves through the build bed during a post-print operation or the flow axis is defined by a type of post-print operation to be performed on the build bed; and
three-dimensionally (3D) printing the part within the build volume of the build bed in accordance with the digital model as has been rotated.

19. The non-transitory storage medium as claimed in claim 18, wherein the instructions, when executed by the processor, cause the computing device to:
determine a reference axis of the part, and rotating the digital model such that the reference axis is aligned parallel to the flow axis, and determining the reference axis comprises either:
(i) determining principal axes of inertia of the part, and selecting that principal axis having a moment of inertia that is smallest; or
(ii) determining, for each of a plurality of axes, a projected area of the part in a plane normal to the each of the plurality of axes, and selecting that axis having the projected area that is smallest.

20. The non-transitory storage medium as claimed in claim 18, wherein the instructions, when executed by the processor of the computing device, further cause the computing device to:
after 3D printing the part, perform the post-print operation, including moving the flow of the gas through the build bed, resulting in removal of powdered build material from the part,
wherein rotation of the digital model within the build volume of the build bed improves the removal of the powdered build material from the part during movement of the flow of the gas through the build bed after the part has been 3D printed in accordance with the digital model.

* * * * *